United States Patent [19]
DeVries

[11] 3,780,758
[45] Dec. 25, 1973

[54] NON-METALLIC CARTRIDGE VALVE
[75] Inventor: Robert Wopke DeVries, Grand Rapids, Mich.
[73] Assignee: Wolverine Brass Works, a Division of Wolverine Industries, Inc., Grand Rapids, Mich.
[22] Filed: Nov. 15, 1972
[21] Appl. No.: 306,598

[52] U.S. Cl. .................. 137/454.6, 137/625.46
[51] Int. Cl. ............................................ F16k 25/00
[58] Field of Search .............. 137/454.5, 454.6, 137/625.46

[56] References Cited
UNITED STATES PATENTS
3,229,210  1/1966  Keller .......................... 137/454.5 X
3,421,540  1/1969  Fulton ............................ 137/454.6
3,040,770  6/1962  Boettcher ........................ 137/454.6

Primary Examiner—Harold W. Weakley
Attorney—J. Warren Kinney, Jr.

[57] ABSTRACT

The valve is of the replaceable cartridge or unit type, and is constructed mainly of durable non-metallic materials which resist corrosion, wear, and adherence of foreign materials usually carried by the fluid under control of the valve; the valve featuring also a 90° limit of operating stem rotation and a minimum number of simple components capable of fabrication and assembly with great savings of time and labor so that the valve may be produced at low cost.

20 Claims, 10 Drawing Figures

PATENTED DEC 25 1973 3,780,758
SHEET 1 OF 2
FIG 2
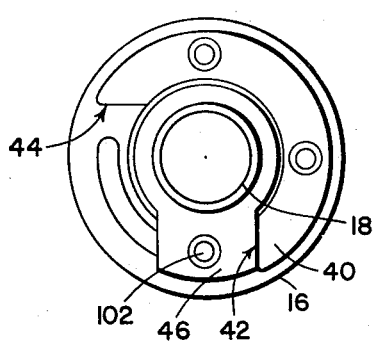
FIG 4
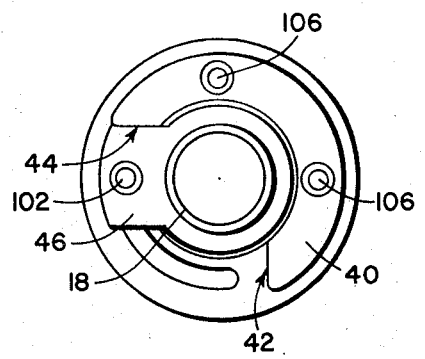
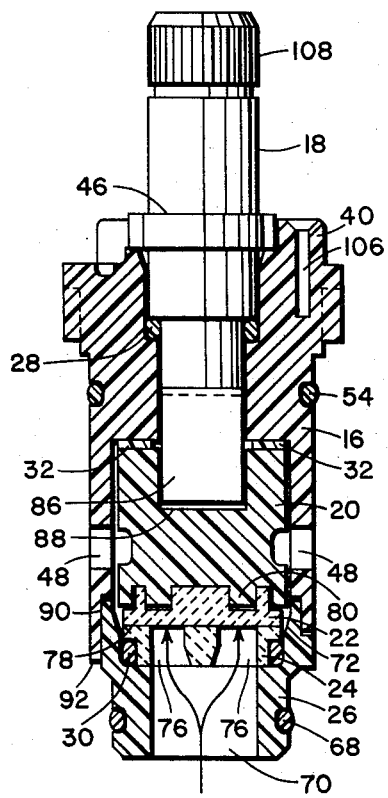
FIG 1
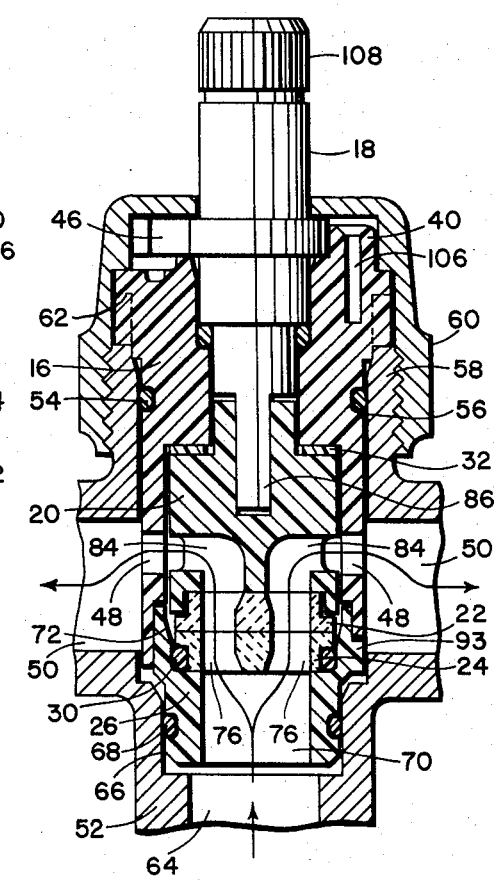
FIG 3

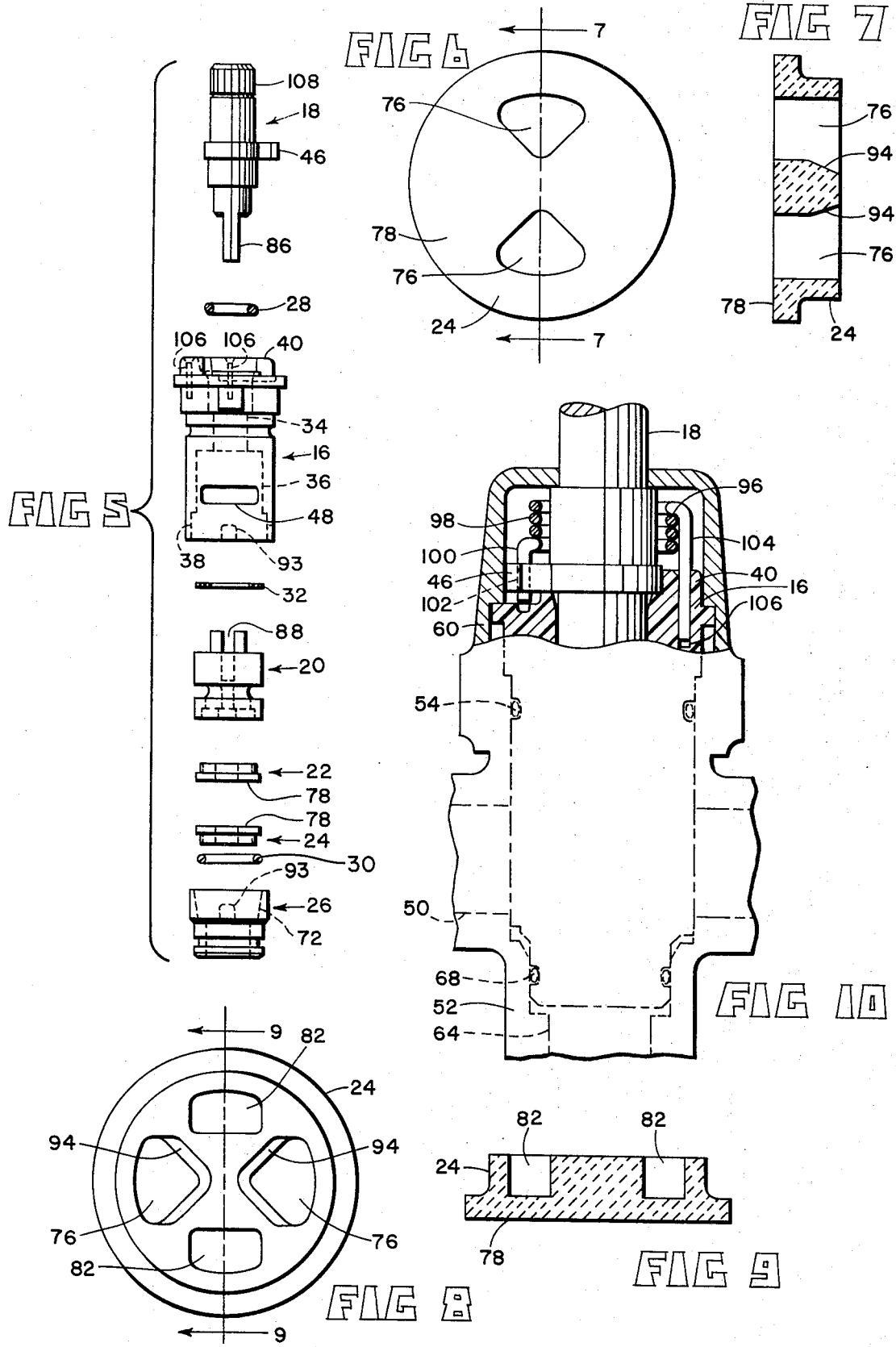

NON-METALLIC CARTRIDGE VALVE

BACKGROUND OF THE INVENTION

Faucet valves have been proposed, featuring replaceable cartridges or units which contain the stem and valving elements preassembled therein, so that replacement cartridges may be conveniently substituted for original valving means in a faucet body, as disclosed in the following U.S. Pat. Nos.: 3,561,729; 3,433,264; 3,040,770; 2,923,318; and 3,144,042.

The prior art includes also various proposals to incorporate in a faucet valve, different types of valving means in the form of discs disposed in flatwise contact and suitably apertured or ported to permit fluid flow, or terminate it, incident to 90° rotation of one disc relative to the other. The discs of such valves have been described as discs of metal or ceramic material, as evidenced by certain of the aforesaid and the following U.S. Pat. Nos. 2,696,219; 2,935,293; 2,696,363; 3,533,444; 3,476,149; 1,120,975 and 937,368.

Other patents of more or less value as prior art references concerning the subject matter of the present invention, are the following U.S. Pat. Nos.: 248,918; 1,265,971; 3,160,390; 3,169,549; and 3,330,294.

The valve structures of the prior art have presented various problems, such as complexity and high cost of operating parts or their assembly procedure. In other instances, the valves are considered vulnerable to rapid wear or deterioration resulting in unreliability of service or operation. This is especially true of valves used in domestic or public wash bowl service or bath service, where actuation may be very frequent or abusive.

An object of the present invention is to provide an improved cartridge valve which is foolproof, rugged, efficient and economical to manufacture.

SUMMARY OF THE INVENTION

The present valve is of the replaceable cartridge or unit type, that is, all the operating parts are fully protected and contained within a capsule or cartridge that may easily and quickly, with ordinary tools, be removed from or installed within a conventional faucet body without the exercise of skill or extreme care. The valve of the cartridge as supplied, is tamper-proof and admits of no adjustment or disassembly of parts subsequently to initial factory assembly.

The valving members or seats are formed as discs of ceramic or like hard material, so highly ground, lapped, and polished, as to preclude entry therebetween of any foreign substances which might otherwise damage the seats and cause leakage. The valving discs are relatively movable through a maximum 90° arc, between fully open and fully closed positions, with no longitudinal shifting of the operating stem. Accordingly, the stem seal is simplified and relieved of excessive wear, and a desirably constant minimal gap is maintained between the operating handle and the valve body.

The valving members of ceramic or equivalent material offer very high resistance to wear, corrosion, and frictional drag, and will not contaminate any fluid having contact therewith. The fluid ports in the valving members are made of a triangular shape to ensure gradual opening and closing thereof within an approximate 75° limit of rotation, thereby to achieve desirable full flow characteristics and smooth operation of the valve. The use of low-friction packing or sealing throughout the valve, made possible by eliminating axial shifting of the operating stem, ensures effortless operation and a leak-proof construction.

The cartridge housing and operating parts, exclusive of the operating stem and the ceramic seats, are formed of non-metallic materials which offer superior advantages in manufacture and service. It is found that housing parts of the cartridge made of thermoplastic glass-filled NORYL, or glass-filled POLYSULFONE, or equivalent, can be manufactured inexpensively without waste, and with a minimum expenditure of skilled labor and machining. The non-metallic thermoplastic material employed is readily moldable with great accuracy and a smoth finish, and will withstand shock, temperature changes, and frictional wear to a high degree. It is also subject to solvent-bonding in assembly, to produce a tamper-proof highly effective sealed valve cartridge. The non-metallic thermoplastic material will not contaminate even distilled water and makes this cartridge usable in laboratory fixtures.

Uniformly satisfactory results have been obtained in those instances in which the cartridge parts have been fabricated from a high density plastic, such as, by way of example, glass-filled "NORYL" or glass-filled "POLYSULFONE."

It should be understood that other or equivalent materials supplying the characteristics specified for the housing elements, may be substituted for the materials named above.

BRIEF DESCRIPTION OF THE DRAWINGS

FIG. 1 is an enlarged vertical cross-section of the improved cartridge valve, shown in closed condition.

FIG. 2 is a top plan view of the same.

FIG. 3 is a view similar to FIG. 1, showing the valve in open condition and installed in a faucet body.

FIG. 4 is a top plan view of FIG. 3, with the cartridge valve removed from the faucet body.

FIG. 5 is an exploded view of the cartridge valve on a reduced scale.

FIG. 6 is an enlarged plan view of a ceramic valving member or seat element.

FIG. 7 is a cross-section taken on line 7—7 of FIG. 6.

FIG. 8 is a plan view similar to FIG. 6, showing the reverse side of the valving member.

FIG. 9 is a cross-section taken on line 9—9 of FIG. 8.

FIG. 10 is a side elevation of the cartridge valve, partly broken away, and embodying a torsion spring to render the valve self-closing.

DESCRIPTION OF THE PREFERRED EMBODIMENT

The principal elements of the cartridge valve are the housing 16, the operating stem 18, the adapter or rotor 20, the seats or valving members 22, 24, and the tail piece 26, along with two internal sealing rings 28, 30, and an anti-friction washer 32.

With the exception of the brass operating stem 18, all of the constituents of the cartridge valve are non-metallic. The housing 16, adapter 20, and tailpiece 26, are formed of glass-filled NORYL, or glass-filled POLYSULFONE, or the equivalent, which is substantially rigid after molding and practically unbreakable. The material readily molds to a smooth finish which is non-porous, highly resistant to corrosion and deterioration, and amenable to solvent-bonding in the course of assembly. Use of the material specified in fabricating the improved cartridge valve, effects substantial savings of time, labor, and materials, while at the same time enhancing the serviceability thereof; and due to the very low percentage of water absorption of this material it may be used in valving distilled water without contaminating its purity.

Housing 16 is in the form of a hollow cylinder with open ends, including a bore 34 receptive of rotary stem 18, a coaxial counterbore or chamber 36 to accommodate the rotary adapter 20, and a terminal counterbore 38 to snugly receive the cylindrical hollow open-ended tailpiece 26. At the upper end of housing 16, an integral arcuate upstanding rib 40 (FIGS. 2–4) furnishes spaced abutments 42 and 44 between which is located the radially extended integral arm 46 of stem 18. The abutments constitute a pair of stationary stops which limit rocking movement of arm 46 to a quarter-turn of the stem, for defining the fully open and the fully closed valve positions.

At opposite ends of a diameter of chamber 36 are formed lateral ports 48, 48, through which a fluid controlled by the valve may be released. In common practice, such fluid may be released into the discharge port 50 of a faucet body 52, FIG. 3. Housing 16 may carry an external sealing ring 54 to bear against the cylindrical inner wall 56 of an externally screw-threaded bonnet neck 58 of the faucet body. An internally threaded cap nut 60 removably screwed onto the bonnet neck, surrounds stem 18 and clamps the annular shoulder 62 of housing 16 onto the annular upper end of the bonnet neck.

The inlet port 64 of faucet body 52 may be counterbored as at 66 to receive the cylindrical open lower end portion of tailpiece 26. A sealing ring 68 applied to the tailpiece precludes leakage of fluid along the wall of the counterbore and into discharge spout 50. As is usual, the fluid entering upwardly through port 64 is pressured, and is under the control of the valving elements 22, 24. The sealing rings 68 and 54 preferably are of durable rubber-like material, such as ethylene propylene, or equivalent.

Tailpiece 26 includes an axial bore 70 receptive of fluid from inlet port 64, and a counterbore 72 of larger diameter in which is snugly seated and fixed the stationary ceramic valving element 24, sealed therein by a gasket or O-ring 30 to prevent leakage of fluid about element 24. This is the only sealing ring which cannot be replaced. It is a stationary sealing ring of a durable rubber like material such as ethylene propylene rubber. Valving element 24 includes a pair of diametrally opposed through ports 76, 76, and a ground and lapped highly polished planar face 78. Face 78 is finished to a very high degree of planar accuracy and smoothness, for reasons to be explained.

The tailpiece counterbore 72 preferably is deeper than the thickness of valving element 24, and is open at its top so as to loosely accommodate the cooperative valving element 22. Valving element 22, also of ceramic material, is rotational relative to element 24, and has a ground and lapped highly polished planar face which rests flatwise upon the aforesaid face 78 of element 24. The ceramic valving elements 22 and 24 preferably are of the same size and shape, and may be identical one to the other. Accordingly, FIGS. 6 through 9 are illustrative of both valving elements.

The rotary adapter 20 is molded as a cylinder having at its lower end any suitable means for mounting of the valving element 22. Element 22 may be keyed against rotation relative to the adapter as by means of extending lugs 80 thereon which engage cooperative sockets 82 (FIG. 8) of the valving element. Ports 84, 84 formed in the material of the adapter, are in constant fluid communication with the ports of valving element 22, FIG. 3, so as to provide for release of fluid into spout 50 through ports 48, 48 whenever the valve is in open condition. As will be understood, the valve is open when adapter 20 is rotated by means of stem 18, to place in registry the cooperative ports of the movable and stationary valving elements 22 and 24. Stem 18 may be keyed to the adapter for rotation therewith, by means of a flat tongue 86 of the stem engaging a slot 88 formed in the upper end of the adapter.

It may here be noted that tailpiece 26 which carries the stationary valving element 24, has an upper cylindrical external wall portion 90 (FIG. 1) which fits nicely within the annular depending skirt 92 of housing 16. Wall portion 90 is insertable into the skirt, to the extent of placing the polished face of valving element 24 in firm flatwise contact with the polished face of valving element 22. The tailpiece is to be fixed in the inserted position, to preserve firm contact between the valving elements. Fixation of the tailpiece may be achieved by solvent-bonding the tailpiece portion 90 to the interior wall of skirt 92, this resulting in a practically inseparable connection which renders the working ports of the valve tamper-proof.

Solvent-bonding of the parts as above referred to, involves applying a suitable solvent to the cylindrical external wall portion 90 of the tailpiece, and possibly also to the interior wall of skirt 92, for partially plasticizing the complementary surfaces of the parts, and then assembling the parts to cartridge formation. The parts so treated and assembled are usually held in the ultimately desired relationship until the parts are firmly united by congelation. By this means, the force of flatwise abutment of the valving elements one upon the other, may be predetermined and fixed.

The flat anti-friction washer 32 of CELCON or other inherently slippery and resilient anti-friction material, serves to facilitate rotation of the adapter within housing 16 by means of stem 18. Washer 32 by reason of its inherent resiliency, serves to maintain a desired force of abutment between the polished faces of the valving elements, thereby to overcome any liability of the valve to leak at said elements. Also, the highly polished abutting faces of the valving elements coact to practically eliminate wear and scoring even in the presence of abrasive substances carried by a fluid under the control of the subject valve. Under actual test, the valve has withstood 400,000 opening and closing operations, with sand particles present in the fluid controlled, and the operating characteristics were found unimpaired upon critical examination.

When securing the taiiiece in position upon housing 16, it is advisable to coordinate registration of the ports of the valving elements with the position of the stem arm 46 in its relationship to the stops 42 and 44, so that a true indication of the stance of the valve will be indicated at the two extremes of stem rotation. This may be achieved by means of coordinate markings upon the housing and the tailpiece, or by other means such as providing a cooperative interfitting tongue and notch arrangement at the location 93 (FIGS. 3 and 5), where the housing skirt is secured to the tailpiece.

Referring to FIGS. 7 and 8, it is noted that the openings 76 constituting the valving ports are tapered or chamfered as at 94, to reduce flow friction through the ports and thereby enhance the flow characteristics of the valve. This treatment of the ports is applicable to both of the ceramic valving elements 22 and 24.

FIG. 10 illustrates a slight modification of the cartridge valve, in that it is rendered self-closing by means of a coiled torsion spring 96 applied to the upper end portion of the valve. The coiled portion 98 surrounds the operating stem immediately above the stem arm 46, and has a down-turned end 100 inserted into or passed through a transverse bore 102 of the arm. The opposite end 104 of the spring likewise is down-turned, and is anchored in one of several small upright bores 106 provided in the top of housing 16. The spring is applied under stress, and will tend always to rotate the stem to the closed valve position. The capnut 60 normally covers and protects the spring against damage or loss. The upper end of the operating stem may be fluted as at 108, to frictionally retain a conventional operating handle, not shown.

In practice, the operating stem may be rotated in opposite directions through an arc of 90 degrees, to fully open and close the valve. The stem will be seen to have no longitudinal shifting movement to vary the space between the capnut and the operating handle, and the stem will rotate with ease due to the presence of the anti-friction washer 32 and the highly polished planar contact surfaces of the ceramic valving elements.

With particular reference now to FIGS. 1, 3 and 5, it will be noted that stem 18 as illustrated is a right-hand stem, wherein the valve will be opened upon movement of the stem in a clockwise direction from the closed position of FIGS. 1 and 2, to the fully opened positions of FIGS. 3 and 4. It will be noted that flat tongue 86 of the stem is disposed 90° relative to a line through the center of the stem and arm 46.

The valve may be easily converted for counterclockwise movement for opening the valve by replacing the right-hand stem of FIGS. 1, 3 and 5 with a left-hand stem which is similar to the right-hand stem except for the fact that flat tongue 86 is in line with a line through the center of and integral arm 46. The lefthand stem will be closed when arm 46 of stem 18 is in the position illustrated in FIG. 4, whereas the valve will be fully opened when the stem has been rotated in a counterclockwise position to the position illustrated in FIG. 2.

It will be noted that upstanding rib 40 is on the circumference and on the top side of housing 16 being encapsulated by the cap nut 60. In the event that a torque of considerable force is applied to stem 18, such as could occur with a 6 inch wrist handle, integral arm 46 the stem will be moved with considerable force against abutments 42 and 44 of the housing, however, the plastic material of rib 40 will not be deformed when subjected to such forces due to the backing relationship of the metal cap nut 60.

The valve is simply and inexpensively fabricated of durable indelicate parts which are few in number, and it may easily be removed from a faucet body and replaced as a unit in cartridge form, by a layman, without the exercise of skill or the use of special tools. Once assembled at the factory, the seats and their adjustments cannot be tampered with to depreciate or alter the service life of the valve, which has been increased very substantially by the structural improvements herein set forth.

What is claimed is:

1. A replaceable cartridge type fluid control valve for application to a faucet body having a bored neck-and-spout portion in fluid communicating relationship, comprising in combination: an axially bored cylindrical cartridge housing having open upper and lower ends, and intermediate delivery port means, an elongate operating stem having a key at one end, and a mount for an operating handle at the opposite end, said stem being supported for rotation within the housing bore; an open-ended cylindrical tailpiece secured to the lower end of the housing, and having an open fluid entry port and an internal port; a stationary valving member fixed to said tailpiece in spanning relation to said internal port, and having a ported, highly polished seat face disposed upwardly toward the stem; an adapter rotational within the housing, and having port means therein to communicate with the delivery port means of the housing and the internal port of the tailpiece; a rotary valving member rotational with the adapter, and having ports therein selectively communicative with the ports of the stationary valving member upon partial rotation of the adapter, said rotary valving member having a highly polished seat face flatly abutting the aforesaid seat face of the stationary valving member, the ports of said rotary valving member being in constant registry with the ports of the adapter; and cooperative means on the stem and the adapter, for translating rotary movements of the stem to said adapter.

2. The valve as defined by claim 1, wherein the highly polished seat faces of the valving members are of ceramic material.

3. The valve as defined by claim 1, wherein the cartridge housing, the tailpiece, and the adapter are non-metallic, and formed of a material of the class of glass-filled Noryl or glass-filled Polysulfone.

4. The valve as defined by claim 1, wherein the cartridge housing, the tailpiece, and the adapter are non-metallic and formed of a molded thermoplastic material.

5. The valve as defined by claim 2, wherein is included cooperative stop means on the stem and on the cartride housing, for limiting rotation of the stem to approximately a quarter-turn.

6. The valve as defined by claim 1, wherein the faucet neck-and-spout portion bore is smooth, as is also the external wall of the cartridge housing, whereby the cartridge housing is receptive in said faucet bore longitudinally without rotation; and gasket means on the cartridge housing and the tailpiece, to abut and seal against the wall of the neck and spout portion bore.

7. The valve as defined by claim 6, wherein the cartridge housing, the tailpiece, and the adapter are non-metallic and formed of a molded thermoplastic material.

8. The valve as defined by claim 7, wherein the molded thermoplastic material is of the class of glass-filled Noryl or glass-filled Polysulfone.

9. The valve as defined by claim 8, wherein the highly polished seat faces of the valving members are of ceramic material.

10. The valve as defined by claim 4, wherein the tailpiece is welded to the cartridge housing by solvent-bonding.

11. The valve as defined by claim 1, wherein the operating stem includes a laterally extended arm intermediate the stem ends; and a torsion spring connection between said arm and the cartridge housing, tending constantly to rotate the stem in a predetermined direction.

12. The valve as defined by claim 6, wherein the highly polished seat faces of the valving elements are of ceramic material.

13. The valve as defined by claim 12, wherein is included stop means for limiting rotation of the stem to approximately a quarter turn.

14. The valve as defined by claim 13, wherein the tailpiece is permanently solvent-bonded to the cartridge housing.

15. The valve as defined by claim 2, wherein the ports of the ceramic valving members are chamfered to enlarge the open area of each such port at one face only of each valving member.

16. The combination as defined by claim 6, wherein is included a hollow cap nut surrounding the operating stem and overlying the cartridge housing; and means for detachably securing said cap nut to said faucet body neck.

17. The combination as defined by claim 16, wherein the cap nut includes means to clamp the cartridge housing stationarily against said body neck.

18. The combination as defined by claim 17, wherein is included stop means housed within the hollow cap nut, for limiting rotation of the stem to approximately a quarter turn.

19. The combination as defined by claim 17, wherein the operating stem includes a laterally extended arm intermediate the stem ends; and a torsion spring connection between said arm and the cartridge housing tending constantly to rotate the stem in one direction, said arm and said spring connection being located within the confines of the hollow cap nut.

20. The combination as defined by claim 19, wherein is included within the confines of said hollow cap nut, a stop means for limiting rotation of the operating stem to approximately a quarter turn.

* * * * *